(12) United States Patent
Chen et al.

(10) Patent No.: US 10,554,514 B2
(45) Date of Patent: Feb. 4, 2020

(54) DETECTING AND REMEDIATING ROOT CAUSES OF PERFORMANCE ISSUES

(71) Applicant: VMware, Inc., Palo Alto, CA (US)

(72) Inventors: Chien-Chia Chen, Mountain View, CA (US); Lenin Singaravelu, Sunnyvale, CA (US); Ruijin Zhou, Sunnyvale, CA (US); Xiaobo Huang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 641 days.

(21) Appl. No.: 15/335,310

(22) Filed: Oct. 26, 2016

(65) Prior Publication Data

US 2018/0115472 A1 Apr. 26, 2018

(51) Int. Cl.
*H04L 12/26* (2006.01)

(52) U.S. Cl.
CPC .................................. *H04L 43/04* (2013.01)

(58) Field of Classification Search
CPC ........ H04L 43/04; H04L 43/08; H04L 41/142
See application file for complete search history.

(56) References Cited

U.S. PATENT DOCUMENTS

| 7,930,593 | B2 * | 4/2011 | Ozonat | G06F 11/0709 714/33 |
| 9,244,713 | B1 * | 1/2016 | Krishna | G06F 9/5077 |
| 2009/0204574 | A1 * | 8/2009 | Vlachos | G06F 16/2474 |
| 2013/0236002 | A1 * | 9/2013 | Jennings | H04M 3/00 379/265.12 |
| 2014/0324862 | A1 * | 10/2014 | Bingham | G06F 9/45533 707/737 |
| 2015/0081881 | A1 * | 3/2015 | Eaton | H04L 47/785 709/224 |
| 2015/0358836 | A1 * | 12/2015 | Zhu | H04W 16/10 370/329 |
| 2016/0092516 | A1 * | 3/2016 | Poola | G06F 16/2379 707/776 |
| 2016/0140208 | A1 * | 5/2016 | Dang | G06F 17/18 707/737 |
| 2016/0323161 | A1 * | 11/2016 | Cuervo Laffaye | G06F 9/5044 |
| 2017/0019308 | A1 * | 1/2017 | Rapoport | H04L 41/12 |
| 2017/0155570 | A1 * | 6/2017 | Maheshwari | H04L 43/50 |
| 2017/0279703 | A1 * | 9/2017 | Wasmundt | H04L 43/16 |
| 2017/0373960 | A1 * | 12/2017 | Sachdev | H04L 43/10 |

* cited by examiner

*Primary Examiner* — Philip J Chea
*Assistant Examiner* — Mohammed Ahmed
(74) *Attorney, Agent, or Firm* — Fish & Richardson P.C.

(57) ABSTRACT

Exemplary methods, apparatuses, and systems include receiving time series data for each of a plurality of performance metrics. The time series data is sorted into buckets based upon an amount of variation of time series data values for each performance metric. The time series data in each bucket is divided into first and second clusters of time series data points. The bucket having the greatest distance between clusters is used to determine a performance metric having a greatest distance between clusters. The performance metric having the greatest distance between clusters is reported as a potential root cause of a performance issue.

17 Claims, 3 Drawing Sheets

DETECTING AND REMEDIATING ROOT CAUSES OF PERFORMANCE ISSUES

FIELD OF THE INVENTION

The various embodiments described in this document relate to detecting root causes of performance issues in a complex computing environment. In particular, embodiments analyze large sets of time series performance metrics using bucket-guided hierarchical clustering to eliminate noise and generate a report of potential root causes of performance issues.

BACKGROUND OF THE INVENTION

In a complex computing environment, determining the root cause of a performance issue is difficult and time consuming. For example, the scale and complexity involved in a virtualized environment having large numbers of software and hardware components, as well as multiple physical and virtual machines generating heterogeneous workloads, results in large amounts of performance metrics data. Additionally, interactions between components and/or machines cause a high degree of variance. For example, in a distributed virtual storage area network (VSAN), a poorly performing disk on one host may result in highly varying guest application throughput because the throughput is dependent upon which of the distributed disks in the VSAN is targeted by each input/output (I/O) request.

In trying to determining the root cause of a performance issue, any information that is irrelevant to the problem is considered noise. Differentiating noise from root causes in such large amounts of varying performance statistics contributes to the difficulty and amount of time needed to determine a root cause. If the noise is not filtered out, however, it becomes impractical to establish a performance baseline and determine whether or not a performance issue is present in a particular set of performance statistics. Furthermore, one performance issue may overlap and effectively mask another performance issue. Isolating these overlapping performance issues increases the difficulty in troubleshooting and debugging. With this level of difficulty and delay in detecting root causes, the generation of a solution to the performance issue(s) can be delayed beyond the ever-shortening development cycle for a given set of products.

BRIEF DESCRIPTION OF THE DRAWINGS

The present embodiments are illustrated by way of example and not limitation in the figures of the accompanying drawings, in which like references indicate similar elements, and in which.

DETAILED DESCRIPTION

This document describes embodiments that use bucket-guided hierarchical clustering to detect root causes of performance issues within a complex computing environment. In particular, embodiments receive time series data for each of a plurality of performance metrics for workloads and/or components within the computing environment. Hundreds if not thousands of performance metrics may be represented within the time series data. The time series data is recursively bucketed and clustered, each pass of recursion bucketing and clustering within each of the two clusters having the maximum multidimensional distance between them until a recursion level is reached at which a bucket cannot successfully be divided into two clusters. Additionally, in each of one or more recursive applications of bucket-guided hierarchical clustering, a performance metric having the greatest distance between portions of time series data values in the two clusters is reported as a potential root cause of a performance issue. As a result of this bucket-guided hierarchical clustering approach, noise is filtered out of a large set of performance metrics and possible root causes are quickly identified for further analysis or to trigger remediation.

Figure 1:
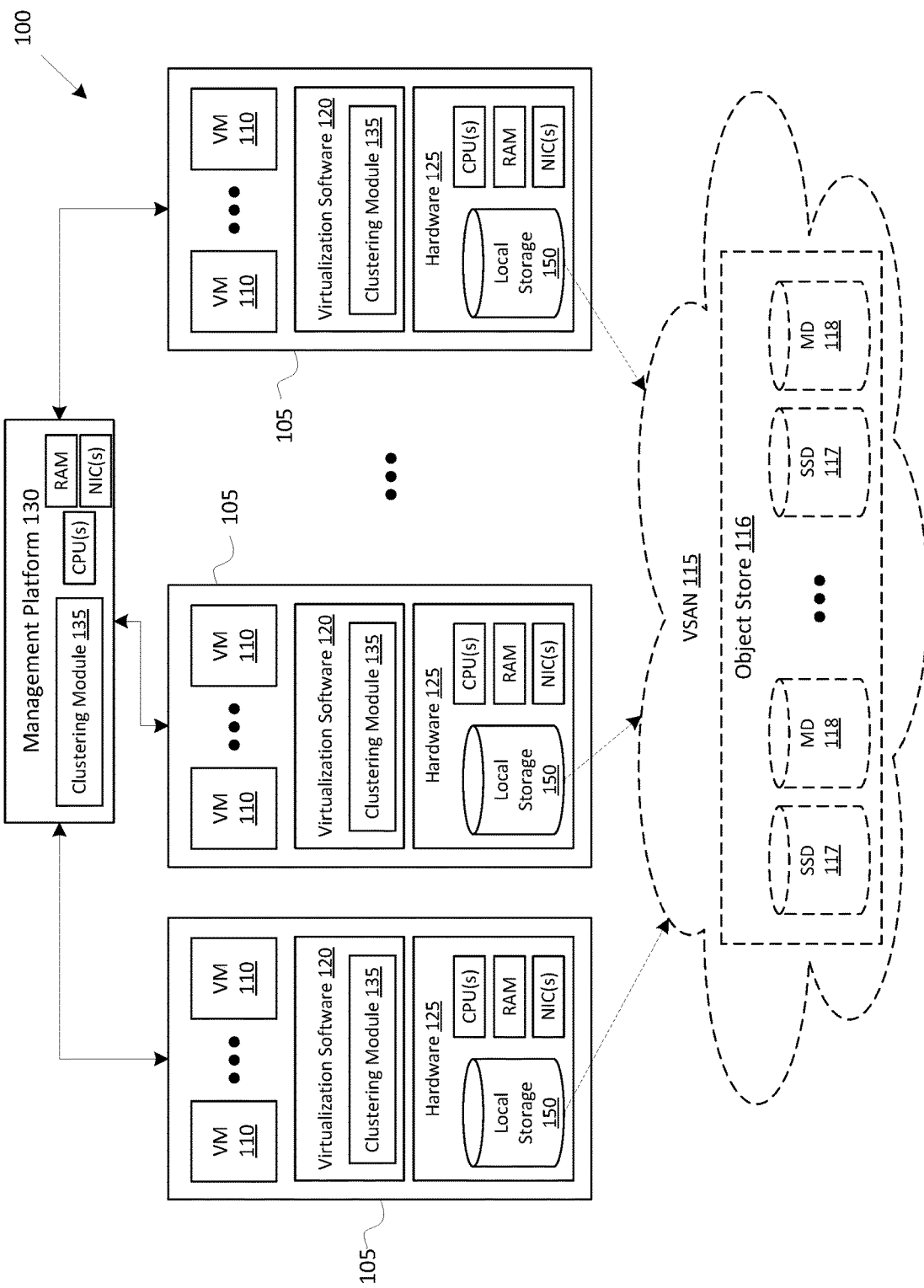
FIG. 1 illustrates, in block diagram form, one or more networked processing devices within a distributed virtual storage area network detecting root causes of performance issues.

FIG. 1 illustrates, in block diagram form, exemplary computing environment 100, including one or more networked processing devices to detect root causes of performance issues. Nodes 105 may also be referred to within this document as hosts, computers, and/or servers. In one embodiment, server-based computing in computing environment 100 provides centrally-managed user virtual desktops, such as those implemented by virtual machines (VMs) 110, via one or more networks (e.g., a local area network or other private or publically accessible wide area network, such as the Internet). For example, a client device and a VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by the VM 110. In one embodiment, one or more VMs 110 implement a virtualized compute, networking, storage, or security service (e.g., a firewall, webserver, database server, etc.).

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. The memory may be internal or distributed memory.

One or more buses may be used to interconnect the various components of hardware 125. Additionally, the network interface controllers may be used to connect nodes 105, via a wired or wireless network, with one another.

Virtualization software layer 120 runs on hardware 125 of host server or node (e.g., a physical computer) 105. Virtualization software layer 120 manages VMs 110 and physical resources, such as hardware 125. Additionally, virtualization software layer 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within storage 150 that may be accessed by VMs 110 residing in one or more nodes 105.

Management platform 130 is associated with nodes 105. Management platform 130 enables an administrator to manage the configuration of computing environment 100. In one embodiment, management platform 130 provides a management console for manual and automated monitoring and control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130. In one embodiment, management platform 130 includes CPU(s), RAM, and NIC(s) similar to hardware 125 described with reference to nodes 105. In an alternate embodiment, management platform 130 runs within a node 105, e.g., within a VM 110.

As shown, computing environment 100 includes software-based "virtual storage area network" (VSAN) 115 that leverages local storage 150 housed in or directly attached to host servers or nodes 105 (as used in this document, the term "housed" or "housed in" may be used to encompass both housed in or otherwise directly attached storage). Local storage 150 housed in or otherwise directly attached to the nodes 105 may include combinations of solid state drives (SSDs) 117 and/or magnetic or spinning disks (MDs) 118. VSAN 115 provides an aggregate block object store 116 to VMs 110 running on nodes 105. For example, each individual block (e.g., a 4 KB portion of storage) may be individually updated as a storage entry. Each VM 110 is able to transparently store objects across distributed local storage 150 of multiple nodes 105. As a result of the distributed nature of VSAN 115, the performance of a given component in the storage path may have a significant impact on the performance of multiple VMs 110 or other components within computing environment 100.

Each of management platform 130 and virtualization software 120 is illustrated as including clustering module 135. In one embodiment, a primary clustering module 135 within management platform 130 collects time series performance metric data from secondary clustering modules 135 in each node 105. The primary clustering module 135 detects root causes of performance issues using bucket-guided hierarchical clustering, e.g., as described with reference to FIGS. 2-3. In another embodiment, primary clustering module 135 is implemented within virtualization software 120 or a VM 110 of one of nodes 105.

Figure 2:
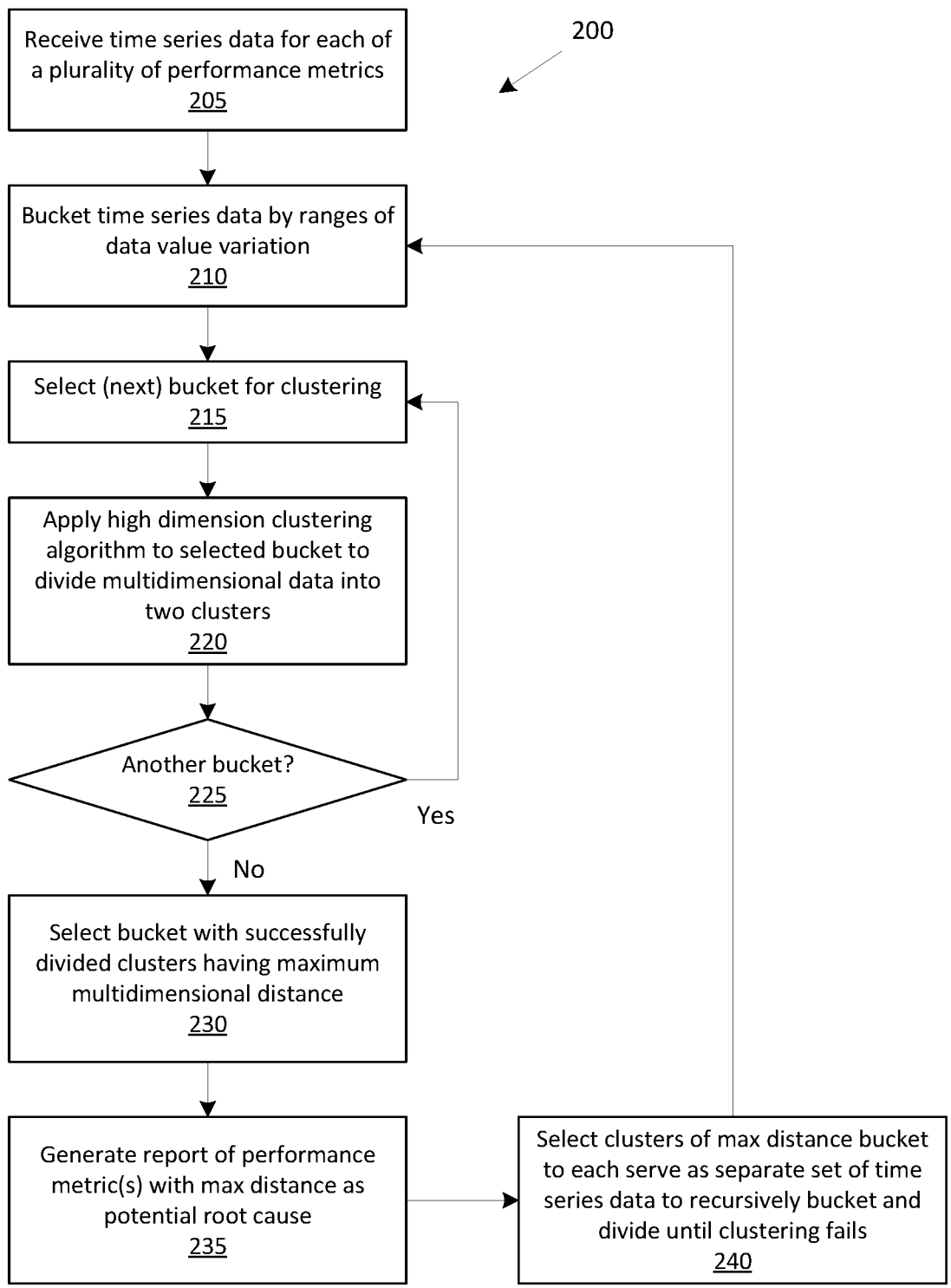
FIG. 2 is a flow chart illustrating an exemplary method of detecting root causes of performance issues using bucket-guided hierarchical clustering.

FIG. 2 is a flow chart illustrating exemplary method 200 of detecting root causes of performance issues using bucket-guided hierarchical clustering. At block 205, clustering module 135 (e.g., primary clustering module 135 within management platform 130) receives time series data for each of a plurality of performance metrics from the various components of computing environment 100. For example, clustering module 135 collects a variety of machine-generated log data including application logs, network traces, configuration files, messages, performance data, system state dumps, and more. The performance data measures performance in terms of, e.g., input/output operations per second (TOPS), latency, throughput, CPU usage, etc. Given the complexity of computing environment 100, clustering module 135 may receive thousands of different time series performance metric data sets. For example, a data set may provide a snapshot of values for the performance metric for a particular component over a period of time.

At block 210, clustering module 135 buckets the received time series data by ranges of data value variation. For example, clustering module 135 may calculate the standard deviation or other representation of data value variation for each time series data set. Each performance metric data set is assigned to a bucket with a corresponding range of standard deviation values. Examples of bucket ranges may include a first bucket for standard deviation values between 0-99, a second bucket for standard deviation values between 100-999, a third bucket for standard deviation values between 1000-9,999, a fourth bucket for standard deviation values between 10,000-99,999, etc. In one embodiment, bucket ranges are set based upon a logarithmic scale and the largest bucket range is bounded by infinity. If clustering module 135 calculates the standard deviation of TOPS for a particular local storage 150 as being 500, the time series data set representing TOPS for that local storage 150 would be assigned to the second bucket. In another embodiment, clustering module 135 buckets the received time series data sets according to a minimum performance metric value, maximum performance metric value, average performance metric value, or another representative value of the time series data set(s). In one embodiment, clustering module 135 buckets the time series data sets such that each data set can be viewed individually as well as a dimension of a high-dimensional data set representing all time series data sets within the bucket.

At block 215, clustering module 135 selects a bucket to subject to a clustering algorithm. If no buckets have been subjected to the clustering algorithm, clustering module 135 selects a first bucket. In one embodiment, clustering module 135 omits a bucket from clustering. For example, a bucket representing time series data with data variation below or above a threshold may be deemed noise and omitted from further analysis.

At block 220, clustering module 135 applies a clustering algorithm to the selected bucket. In one embodiment, the clustering algorithm is designed to create clusters from high-dimensional data. For example, HDclassif or another high-dimensional data clustering algorithm may be used to divide the bucket of data sets into two statistically dissimilar clusters.

In one embodiment, if the clustering fails, the bucket remains undivided. For example, if the bucketed time series data lacks a threshold amount of difference, clustering module 135 will be unable to divide the bucket into two clusters. In particular, if the clustering algorithm is unable to create two clusters that have a minimum threshold multidimensional distance between them, the clustering is deemed unsuccessful and data sets are not divided.

In one embodiment, distance between clusters is determined by comparing an average of normalized values between clusters. In another embodiment, clustering module 135 determines distance between clusters based upon another representative value in each clusters, e.g., a minimum value, a maximum value, a mean value, etc. As described in this document, clustering module 135 may determine both a multidimensional distance between clusters as well as individual dimension/data set distances.

In one embodiment, clustering module 135 deems the clustering to be unsuccessful when one or more particular performance metric data sets are the dimension(s)/data set(s) with the largest distance(s) between clusters for multiple levels of recursion. For example, as described further herein, clusters may be recursively bucketed and clustered. If a particular performance metric data set, e.g., TOPS for a particular local storage 150, represented the data set having the largest distance in values between clusters in one or more levels of recursion, an attempt to divide a bucket using the clustering algorithm in a subsequent level of recursion would fail if that particular performance metric data set would once again be the data set having the largest distance in values between clusters if the bucket were to be divided. In one embodiment, the clustering algorithm divides the bucket into clusters, tests the clusters for repetition in the greatest distance for one or more dimensions/data sets and, if the test fails due to a particular performance metric data having a repetitious largest distance in values between clusters, the clusters are merged back together.

In one embodiment, clustering module 135 deems the clustering to be unsuccessful when one or more particular performance metric data sets are not the dimension(s)/data set(s) with the largest distance(s) between clusters for multiple levels of recursion. For example, a set of primary performance metrics may be selected by a user or provided by default. If the clustering algorithm divides the bucket into clusters and determines none of the primary performance metric data sets account for the largest distance(s) in values between clusters, the clusters are merged back together.

At block 225, clustering module 135 determines if additional buckets remain to be subjected to the clustering algorithm. If additional buckets remain, method 200 returns to block 215 to select the next bucket.

If no additional buckets remain, at block 230, clustering module 135 selects the bucket that has the largest inter-cluster distance among the buckets in the current level of recursion that were successfully divided into clusters. In one embodiment, clustering module 135 determines the multi-dimensional distance between each pair of clusters and selects the bucket having the pair of clusters with the greatest multidimensional distance. In another embodiment, clustering module 135 selects the bucket that has the largest single dimension of distance between clusters.

At block 235, clustering module 135 generates a report of one or more performance metrics that are potential root causes of performance issues. Clustering module 135 selects one or more of the top K (K being a whole number constant) performance metric time series data sets that account for the largest distance between the two clusters of the selected bucket. For example, of all of the performance metrics included in the selected bucket having a pair of clusters with the greatest distance between them, clustering module 135 may determine that TOPS for a particular local storage 150 accounts for the dimension or data set with the largest distance between clusters. In response to the determination, clustering module 135 generates or otherwise updates a report to include the TOPS for that particular local storage 150 as a potential root cause for one or more performance issues.

At block 240, clustering module 135 selects each of the two clusters in the selected bucket having the greatest cluster distance to recursively repeat the method 200 until clustering fails. For example, the selected bucket was divided into a first and a second cluster. The first cluster is treated as the time series data to be bucketed in block 210 and method 200 continues as described above. Additionally, the second cluster is also (e.g., in parallel) treated as the time series data to be bucketed in block 210 and method 200 continues as described above. If none of the buckets created from the first cluster and none of the buckets from the second cluster are successfully divided into clusters, method 200 terminates. If at least one bucket created from the first and second clusters is successfully divided into clusters, recursive method 200 continues.

In subsequent levels of recursion, the ranges represented by buckets are narrowed. For example, if the third bucket for standard deviation values between 1000-9,999 was selected, each cluster from the third bucket may be further divided into buckets for subsets of standard deviation values between 1000-9,999, such as standard deviation ranges between 1,000-2,499, 2,500-4,999, 5,000-7,499, and 7,500-9,999. Alternatively, bucket ranges are selected based upon a logarithmic scale.

With each recursive pass through method 200, a report may be generated and/or updated to include another performance metric as a potential root cause for performance issues. For example, each recursive pass that successfully divides a bucket into two clusters and identifies those clusters as having the maximum inter-cluster distance among the pairs of clusters in the current pass of recursion will result in cluster module 135 generating or updating a report to include the performance metrics with the top K inter-cluster distance(s).

In one embodiment, the generation of a report triggers remediation of the performance issue based upon the identified root cause. For example, clustering module 135 or management platform 130 may trigger a rebalancing of data across disks in response to method 200 identifying several underutilized disks during a period of low throughput. Alternatively, an administrator may review the generated report and manually trigger the rebalancing. As another example, an increase in read cache size may be automatically or manually triggered in response to method 200 detecting a high read cache miss rate during a time of high read latency. In yet another example, a dedicated processing core may be automatically or manually assigned to a process in response to method 200 detecting the process is consuming the greatest amount of processing resources. Additionally, the high consumption of processing resources (or another identified root cause) may be automatically or manually flagged as a potential bug for the developers of the offending process. In one embodiment, the detected root cause may trigger the examination of hardware components. For example, method 200 may detect network errors as a potential root cause during a time of high latency in the system and trigger an alert to examine the network cards and network interconnect for potential replacement.

Figure 3:
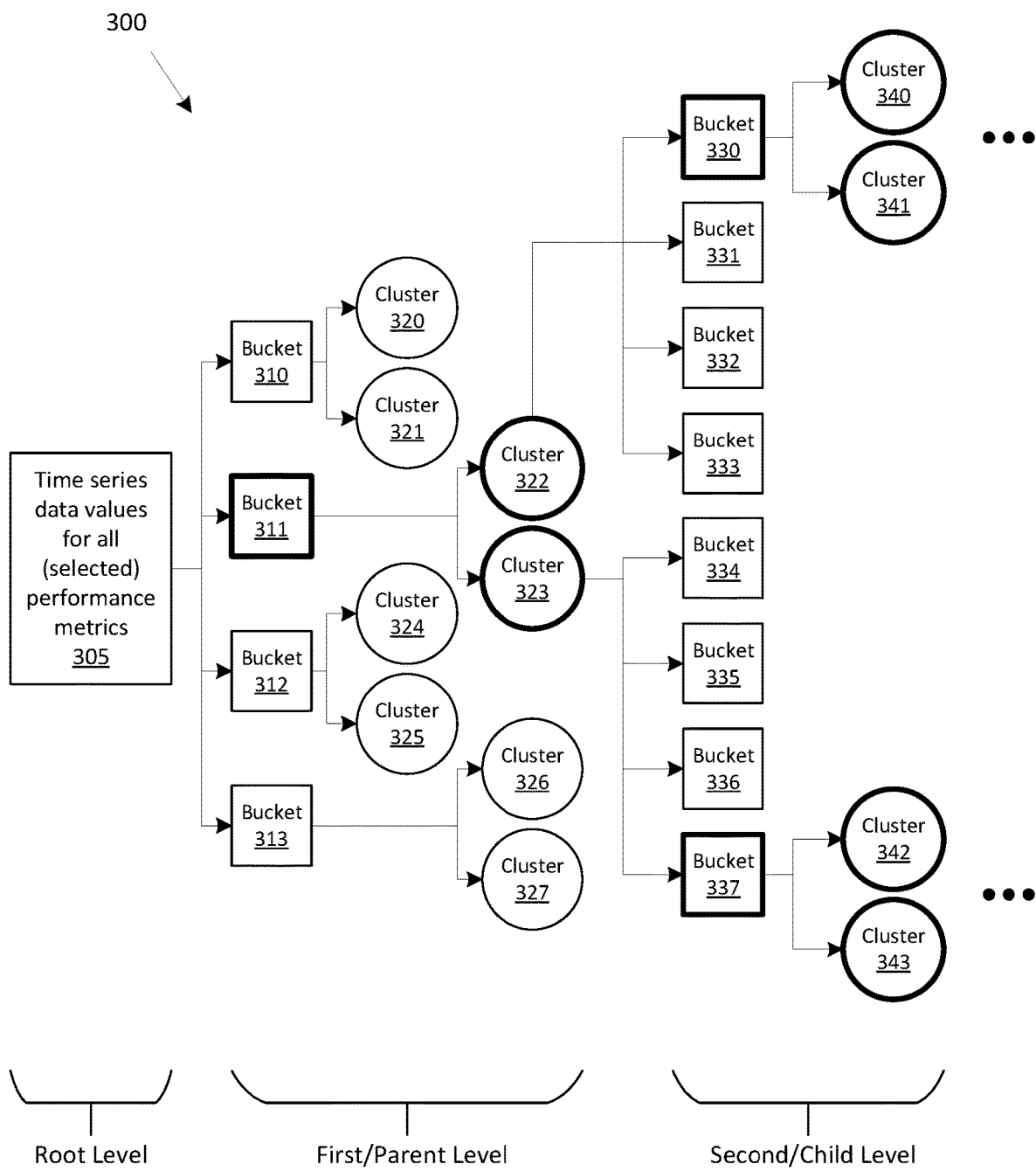
FIG. 3 illustrates an exemplary tree resulting from bucket-guided hierarchical clustering.

FIG. 3 illustrates exemplary tree 300 resulting from bucket-guided hierarchical clustering. For example, at the root level of the tree, block 305 represents an initial collection of time series data for each of a plurality of performance metrics. This collection may represent the time series data for each of a plurality of performance metrics described above as being received at block 205 of method 200. Clustering module 135 separates the collection of time series data into buckets 310-313. Clustering module 135 applies a clustering algorithm to each of buckets 310-313. The clustering algorithm divides bucket 310 into clusters 320 and 321, bucket 311 into clusters 322 and 323, bucket 312 into clusters 324 and 325, and bucket 313 into clusters 326 and 327. Buckets 310-313 and clusters 320-327 represent the first level of hierarchy in the tree.

As indicated by a heavier line weight, clustering module 135 determines that the distance between clusters 322 and 323 is greater than the distances between clusters 320 and 321, between clusters 324 and 325, and between clusters 326 and 327, respectively. Clustering module 135 determines the performance metric(s) representing the data sets with the top K inter-cluster distance(s) and generates/updates the root cause report.

Upon completing the bucketing and clustering pass on the first level of the tree, clustering module 135 begins recursive passes of the bucket-guided hierarchical clustering on each of clusters 322 and 323. For example, clustering module 135 separates cluster 322 into buckets 330-333 and attempts to divide each of buckets 330-333 into pairs of clusters. Similarly, clustering module 135 separates cluster 323 into buckets 334-337 and attempts to divide each of buckets 334-337 into pairs of clusters. Buckets 330-337 and clusters 340-343 represent the second level of hierarchy in the tree.

Within this second level of the tree, clustering module 135 may fail to divide some of the buckets into clusters. For example, one or more of buckets 331-336 may represent buckets that clustering module 135 failed to divide into clusters. As a further example, clustering module 135 may fail to divide bucket 333 into clusters because the performance metric representing the maximum distance between potential clusters for bucket 333 was already generated as a potential root cause when determined to represent the maximum distance between clusters 322 and 323 in the parent level of hierarchy.

Clustering module 135 continues recursively applying bucket-guided hierarchical clustering at each level of the tree until all buckets of a current level of the tree fail to be divided by the clustering algorithm. For example, clustering module 135 determines that clusters 340 and 341 represent the largest inter-cluster distance among buckets 330-333 and that clusters 342 and 343 represent the largest inter-cluster distance among buckets 334-337. In response to those determinations, clustering module 135 recursively iterates the bucket-guided hierarchical clustering for each of clusters 340-343 until clustering fails. Once clustering fails, clustering module 135 generates and/or updates the report including potential root causes to trigger further analysis and troubleshooting.

It will be apparent from this description that aspects of the inventions may be embodied, at least in part, in software. That is, the computer-implemented method 200 may be carried out in a computer system or other data processing system, such as nodes 105 and management platform 130, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node 105 and/or management platform 130. It will also be appreciated that additional components, not shown, may also be part of nodes 105 and/or management platform 130, and, in certain embodiments, fewer components than that shown in FIG. 1 may also be used in nodes 105 and/or management platform 130.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   receiving time series data values for each of a plurality of performance metrics for a computing environment;
   determining an amount of variation of time series data values for each performance metric within the plurality of performance metrics;
   in response to determining the amount of variation, assigning, for each performance metric, the performance metric time series data values to a bucket, of a plurality of buckets, based upon the amount of variation, wherein each bucket has a particular range of values for the amount of variation;
   clustering time series data values assigned to one or more buckets by dividing time series data values for the performance metrics in each bucket into first and second clusters of time series data values;
   determining which of the buckets has been divided into first and second clusters with a greatest distance between clusters;
   determining, within the bucket having the greatest distance between clusters, a performance metric having a greatest distance between clusters;
   recursively bucketing and clustering time series data values within each of the first and second clusters of the bucket determined to have the greatest distance between clusters until the time series data values within a set of buckets cannot successfully be divided into first and second clusters; and
   generating a report identifying the performance metric having the greatest distance between clusters within one or more levels of recursion as a potential root cause of a performance issue.

2. The computer-implemented method of claim 1, wherein the amount of variation of time series data values for each performance metric is a standard deviation value for the time series data values for that performance metric.

3. The computer-implemented method of claim 1, further comprising for each of one or more levels of recursion:
   determining which of the buckets within the level of recursion has been divided into first and second clusters with a greatest distance between clusters;
   determining, within the bucket having the greatest distance between clusters within the level of recursion, a performance metric having a greatest distance between clusters; and
   generating a report identifying the performance metric having the greatest distance between clusters within the level of recursion as another potential root cause of a performance issue.

4. The computer-implemented method of claim 1, wherein a bucket cannot successfully be divided into first and second clusters when the time series data values within the bucket lacks a threshold amount of difference.

5. The computer-implemented method of claim 1, wherein a bucket cannot successfully be divided into first and second clusters when the performance metric having the greatest distance between clusters in a parent level of recursion would also be the performance metric having the greatest distance between clusters in a current level of recursion.

6. The computer-implemented method of claim 1, wherein, for determining which of the buckets has been divided into first and second clusters with the greatest distance between clusters, distance between clusters is a multidimensional distance.

7. The computer-implemented method of claim 1, wherein each bucket represents a range of variation of time series data values and the performance metric time series data values are assigned to the bucket in response to determining the amount of variation of time series data values for the performance metric are within the range of variation for the bucket.

8. A non-transitory computer-readable medium storing instructions, which when executed by a processing device, cause the processing device to perform a method comprising:
   receiving time series data values for each of a plurality of performance metrics for a computing environment;
   determining an amount of variation of time series data values for each performance metric within the plurality of performance metrics;
   in response to determining the amount of variation, assigning, for each performance metric, the performance metric time series data values to a bucket, of a plurality of buckets, based upon the amount of variation, wherein each bucket has a particular range of values for the amount of variation;
   clustering time series data values assigned to one or more buckets by dividing time series data values for the performance metrics in each bucket into first and second clusters of time series data values;
   determining which of the buckets has been divided into first and second clusters with a greatest distance between clusters;
   determining, within the bucket having the greatest distance between clusters, a performance metric having a greatest distance between clusters;
   recursively bucketing and clustering time series data values within each of the first and second clusters of the bucket determined to have the greatest distance between clusters until the time series data values within a set of buckets cannot successfully be divided into first and second clusters; and
   generating a report identifying the performance metric having the greatest distance between clusters within one or more levels of recursion as a potential root cause of a performance issue.

9. The non-transitory computer-readable medium of claim 8, wherein the amount of variation of time series data values for each performance metric is a standard deviation value for the time series data values for that performance metric.

10. The non-transitory computer-readable medium of claim 8, the method further comprising for each of one or more levels of recursion:
    determining which of the buckets within the level of recursion has been divided into first and second clusters with a greatest distance between clusters;

determining, within the bucket having the greatest distance between clusters within the level of recursion, a performance metric having a greatest distance between clusters; and generating a report identifying the performance metric having the greatest distance between clusters within the level of recursion as another potential root cause of a performance issue.

11. The non-transitory computer-readable medium of claim 8, wherein a bucket cannot successfully be divided into first and second clusters when the time series data values within the bucket lacks a threshold amount of difference.

12. The non-transitory computer-readable medium of claim 8, wherein a bucket cannot successfully be divided into first and second clusters when the performance metric having the greatest distance between clusters in a parent level of recursion would also be the performance metric having the greatest distance between clusters in a current level of recursion.

13. The non-transitory computer-readable medium of claim 8, wherein, for determining which of the buckets has been divided into first and second clusters with the greatest distance between clusters, distance between clusters is a multidimensional distance.

14. The non-transitory computer-readable medium of claim 8, wherein each bucket represents a range of variation of time series data values and the performance metric time series data values are assigned to the bucket in response to determining the amount of variation of time series data values for the performance metric are within the range of variation for the bucket.

15. An apparatus comprising:
a processing device; and
a memory coupled to the processing device, the memory storing instructions which, when executed by the processing device, cause the apparatus to:
receive time series data values for each of a plurality of performance metrics for a computing environment;
determine an amount of variation of time series data values for each performance metric within the plurality of performance metrics;
in response to determining the amount of variation, assigning, for each performance metric, the performance metric time series data values to a bucket, of a plurality of buckets, based upon the amount of variation, wherein each bucket has a particular range of values for the amount of variation;
cluster time series data values assigned to one or more buckets by dividing time series data values for the performance metrics in each bucket into first and second clusters of time series data values;
determine which of the buckets has been divided into first and second clusters with a greatest distance between clusters;
determine, within the bucket having the greatest distance between clusters, a performance metric having a greatest distance between clusters;
recursively bucketing and clustering time series data values within each of the first and second clusters of the bucket determined to have the greatest distance between clusters until the time series data values within a set of buckets cannot successfully be divided into first and second clusters; and
generate a report identifying the performance metric having the greatest distance between clusters within one or more levels of recursion as a potential root cause of a performance issue.

16. The apparatus of claim 15, wherein the amount of variation of time series data values for each performance metric is a standard deviation value for the time series data values for that performance metric.

17. The apparatus of claim 15, wherein the instructions further cause the host computer to, for each of one or more levels of recursion:
determine which of the buckets within the level of recursion has been divided into first and second clusters with a greatest distance between clusters;
determine, within the bucket having the greatest distance between clusters within the level of recursion, a performance metric having a greatest distance between clusters; and
generate a report identifying the performance metric having the greatest distance between clusters within the level of recursion as another potential root cause of a performance issue.

* * * * *